(12) United States Patent
Imbruce

(10) Patent No.: US 9,177,407 B2
(45) Date of Patent: Nov. 3, 2015

(54) METHOD AND SYSTEM FOR ASSEMBLING ANIMATED MEDIA BASED ON KEYWORD AND STRING INPUT

(75) Inventor: Doug Imbruce, Westport, CT (US)

(73) Assignee: YAHOO! INC., Sunnyvale, CA (US)

( * ) Notice: Subject to any disclaimer, the term of this patent is extended or adjusted under 35 U.S.C. 154(b) by 1144 days.

(21) Appl. No.: 12/903,723

(22) Filed: Oct. 13, 2010

(65) Prior Publication Data

US 2011/0115799 A1    May 19, 2011

Related U.S. Application Data

(60) Provisional application No. 61/253,275, filed on Oct. 20, 2009.

(51) Int. Cl.
*G06T 13/00* (2011.01)
*G06F 17/30* (2006.01)
*G11B 27/034* (2006.01)

(52) U.S. Cl.
CPC .......... *G06T 13/00* (2013.01); *G06F 17/30265* (2013.01); *G06F 17/30905* (2013.01); *G11B 27/034* (2013.01)

(58) Field of Classification Search
None
See application file for complete search history.

(56) References Cited

U.S. PATENT DOCUMENTS

| | | | |
|---|---|---|---|
| 7,836,110 | B1 | 11/2010 | Schoenbach et al. |
| 2002/0023084 | A1 | 2/2002 | Eyal et al. |
| 2004/0205515 | A1 | 10/2004 | Socolow et al. |
| 2005/0206751 | A1 | 9/2005 | Manico et al. |
| 2006/0271855 | A1 | 11/2006 | Patten et al. |

(Continued)

FOREIGN PATENT DOCUMENTS

| | | |
|---|---|---|
| EP | 1083567 A2 | 3/2001 |
| EP | 1241673 A2 | 9/2002 |
| WO | WO 00/39997 | 7/2000 |

OTHER PUBLICATIONS

European Search Report for EP application 10825428.5 dated Feb. 22, 2013, 8 pgs.

(Continued)

*Primary Examiner* — Daniel Hajnik
(74) *Attorney, Agent, or Firm* — James J. DeCarlo; Greenberg Tarurig, LLP

(57) ABSTRACT

One aspect of the invention is a method for automatically assembling an animation. According to this embodiment, the method includes accepting at least one input keyword relating to a subject for the animation and accessing a set of templates. In this embodiment, each template generates a different type of output, and each template includes components for display time, screen location, and animation parameters. The method also includes retrieving data from a plurality of websites or data collections using an electronic search based on the at least one input keyword and the templates, determining which retrieved data to assemble into the set of templates, coordinating assembly of data-populated templates to form the animation, and returning the animation for playback by a user.

15 Claims, 10 Drawing Sheets

(56) References Cited

U.S. PATENT DOCUMENTS

| | | | |
|---|---|---|---|
| 2007/0008322 A1* | 1/2007 | Ludwigsen | 345/473 |
| 2007/0300158 A1 | 12/2007 | Kasperkiewicz et al. | |
| 2008/0092051 A1 | 4/2008 | Sidon et al. | |
| 2008/0158230 A1* | 7/2008 | Sharma et al. | 345/473 |
| 2008/0163317 A1* | 7/2008 | Mills | 725/109 |
| 2008/0234049 A1 | 9/2008 | LeBlanc et al. | |
| 2008/0244373 A1 | 10/2008 | Morris et al. | |
| 2008/0306995 A1 | 12/2008 | Newell et al. | |
| 2009/0003800 A1* | 1/2009 | Bodin et al. | 386/109 |
| 2009/0216735 A1* | 8/2009 | Dexter et al. | 707/5 |
| 2011/0060756 A1 | 3/2011 | Schoenbach et al. | |

OTHER PUBLICATIONS

Yamaguchi et al., "Webstage: An Active Media Enhanced World Wide Web Browser," Proceedings of the Sigchi Conference on Human Factors in Computer Systems, Mar. 22, 1997, pp. 391-398.

International Search Report and Written Opinion issued for PCT/US10/52478, mailed Nov. 30, 2010, 8 Pages.

* cited by examiner

42

METHOD AND SYSTEM FOR ASSEMBLING ANIMATED MEDIA BASED ON KEYWORD AND STRING INPUT

This application claims priority to U.S. Provision Provisional Patent Application No. 61/253,275, filed on Oct. 20, 2009.

BACKGROUND OF THE INVENTION

Currently, consumer or professional publishers with the desire to create multimedia content for the Internet find the process extremely cumbersome.

Consumers use a variety of offline tools (including Apple's iMovie software and Microsoft's Powerpoint) to generate multimedia. The output produced by these tools is then saved to a user's hard drive and uploaded to sites allowing users to share the output with friends and colleagues (such as with YouTube, SlideShare, etc.). Professional publishers wishing to create appealing multimedia presentations follow the same process with a set of more expensive software packages. Traditional Internet search results in text-heavy SERP ("Search Engine Results Pages") force users to visit a plurality of web sites to discover information they are seeking This experience is extremely cumbersome and time consuming.

SUMMARY OF THE INVENTION

One embodiment of the invention is a method for automatically assembling an animation. According to this embodiment, the invention includes accepting at least one input keyword relating to a subject for the animation and accessing a set of templates. For example, one or several words that the user has typed can be selected from a menu or highlighted in other text in order to be selected and accepted for input. In this embodiment, each template generates a different type of output, and each template includes components for display time, screen location, and animation parameters. In this embodiment, the invention also includes retrieving data from a plurality of websites or data collections using an electronic search based on the at least one input keyword and the templates, determining which retrieved data to assemble into the set of templates, coordinating assembly of data-populated templates to form the animation, and returning the animation for playback by a user. The act of retrieving data can include dynamically retrieving data from a plurality of data sources. FIG. 1 shows one embodiment of such a method for automatically assembling an animation.

Another embodiment of the invention is a system for automatically assembling an animation. In this embodiment, the system includes a query interface for presentation to a user, where the query interface is used to accept at least one input keyword relating to a subject for the animation, and a database having a set of templates. In this embodiment, each template generates a different type of output, and each template includes components for display time, screen location, and animation parameters. The system also includes a searching engine to retrieve data from a plurality of websites or data collections using an electronic search based on the at least one input keyword and the templates, a runtime engine to determine which data to assemble into the set of templates and to coordinate assembly of data-populated templates to form the animation, and a presentation engine to present the animation for playback to the user.

DETAILED DESCRIPTION OF THE INVENTION

A. Overview

The method and system according to the invention for assembling dynamically animated media based on keyword and string input serve two primary purposes: to produce superior multimedia results for any keyword based Internet search, and to allow consumers and professional publishers to easily create multimedia content for the web.

Figure 1:
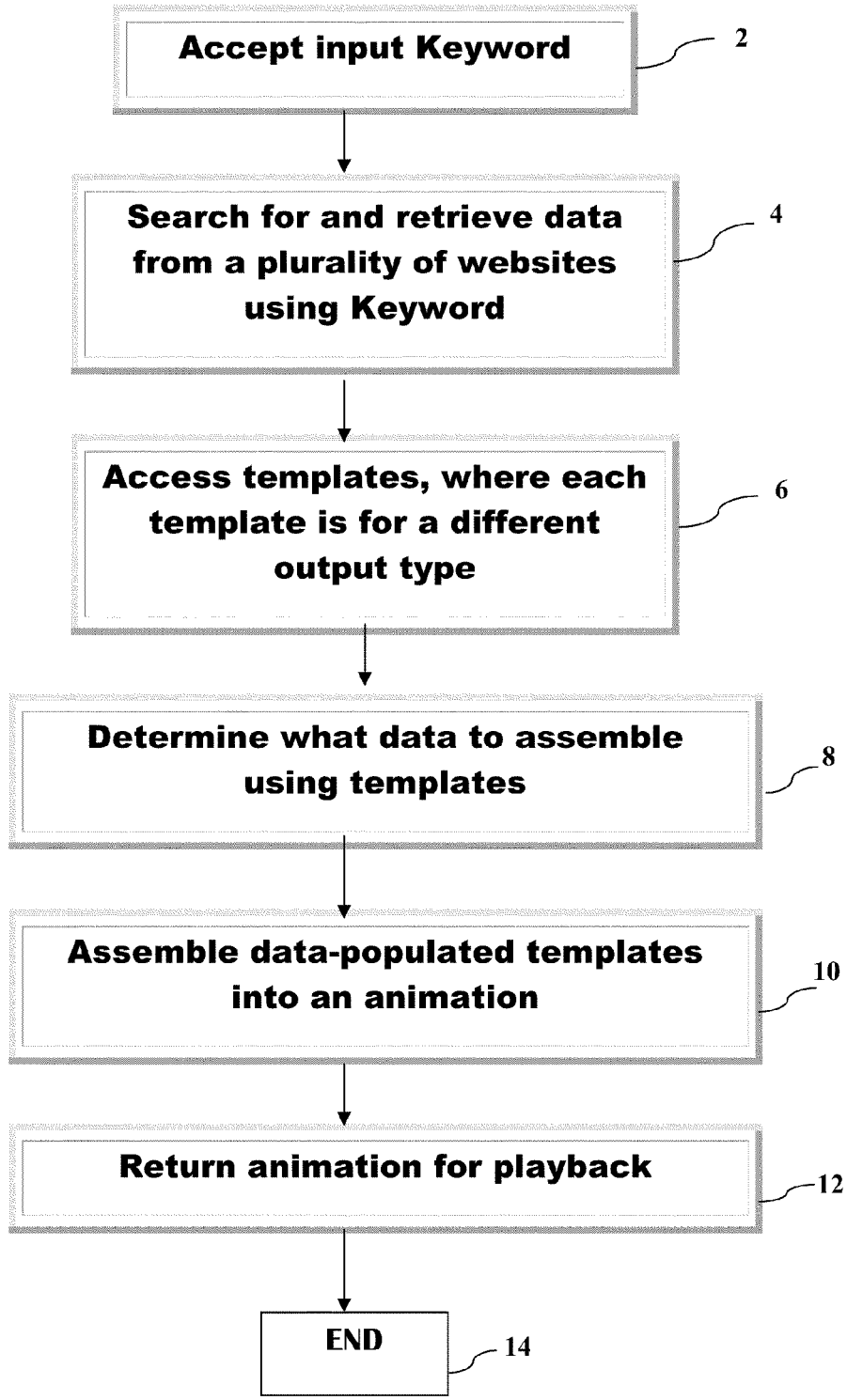
FIG. 1 is a flow diagram regarding one embodiment of a method according to the invention.

FIG. 1 is a flow diagram showing a method according to one embodiment of the invention. In this embodiment, the first step (block 2) involves accepting at least one input keyword (which, for example, can be one or several words that the user has typed or selected from a menu) relating to a subject for the animation. In the next step (block 4), the keyword or keywords are used for searching for and retrieving data from a plurality of websites or other data collections using an electronic search based on the at least one input keyword. The step of retrieving data can include dynamically retrieving data from a plurality of data sources. In block 6, the method can access one or more templates, where each template is for a different output type. For example, in one embodiment, each template generates a different type of output and each template includes components for display time, screen location, and animation parameters. In some embodiments, the search and retrieval of data can be based in part on requirements of the template or templates.

The next step (block 8) in the embodiment of FIG. 1 involves determining which retrieved data to assemble into the template or set of templates. As an example, the most suitable data for the desired presentation or a coherent presentation can be assembled into the template or templates. Block 10 involves coordinating assembly of data-populated templates to form the animation. This step can be performed so that the presentation is coherent in terms of the overall organization of templates to form the presentation. Block 12 involves returning the animation for playback by a user, after which the method is complete (block 14).

1. Content Creation

Employing a system for assembling dynamic animated media based on keyword and string input or content selection, in one embodiment, the system and method are able to evaluate text generated by consumers and publishers, and use this text to generate—on the fly—an appealing multimedia presentation describing the same. Thus, the process for developing compelling multimedia content is drastically simplified.

2. Searching

Typically, users conducting keyword searches on the Internet receive as output a SERP ("Search Engine Results Page"). These pages currently contain a list of links and text excerpts from web pages identified as matches. Often times, these web page results are listed with other media types (news items, images, etc.) that also match the user's query. However, as the Web grows, and the consumption of multimedia content drastically increases, this traditional search experience becomes less relevant—and less useful.

The system according to one embodiment of the invention is a mechanism that evaluates a user's search terms and assembles, on the fly, a multimedia presentation that presents the results of the user's query—whether those results are a narrated definition of the user's search, an answer to a specific question asked by the user, or another form of data presented in a manner consistent with user expectations upon conducting an Internet search using specific words or phrases. In one embodiment, the software then archives each presentation and allows other users to improve the accuracy of the presentation via a set of browser-based editing tools.

3. Assembling Presentations

Accordingly, the system of the invention can be a robust solution offered as a hosted service. It can be used for creating dynamically generated multimedia presentations presenting general Internet search results or in some applications vendor specific data and for creating short multimedia presentations authored by consumers or professional authors, generated by program, or any combination of these creation methods. It can also function as a business-oriented web application allowing professional publishers to develop appealing multimedia presentations based on a dynamic set of web data and as an API allowing third parties to integrate multimedia creation functionality directly into their web applications. The system is a rapid and simple solution for consumer users and professional publishers to develop and consume appealing multimedia on the fly.

Much of the discussion set forth below focuses on use of XML. This is meant to be exemplary only, and other languages and data types can be used within the scope of the invention. In addition, specific examples of types of scenes, data types, and instructions are set forth below. These scenes, data types, and instructions are exemplary only and can vary within the scope of the invention.

B. Animation

Figure 2:
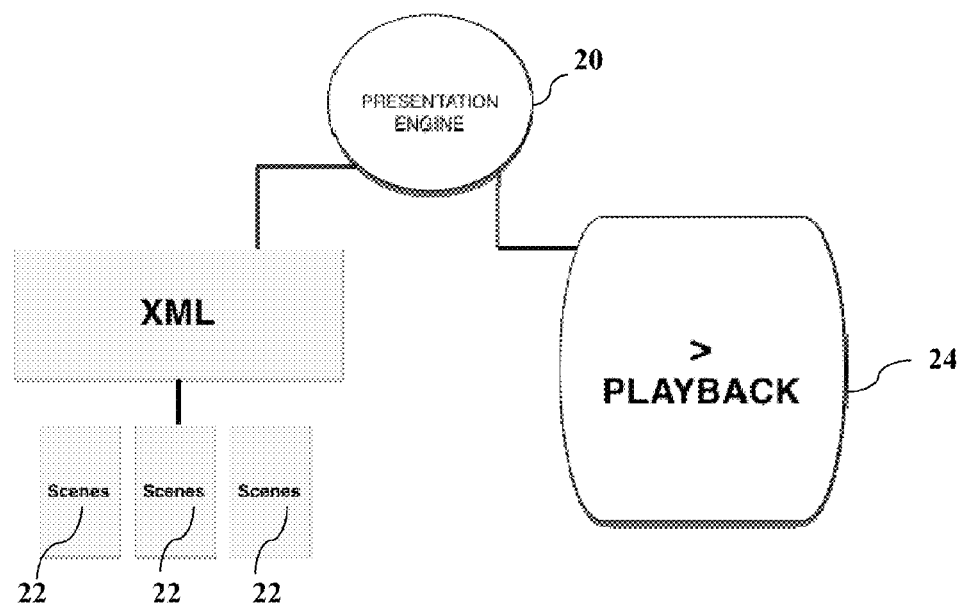
FIG. 2 is a block diagram of one embodiment of a presentation engine.

According to one embodiment, the media creation engine is based upon a library of pre-fabricated and custom-defined "scenes" whose playback is governed by machine or user-customized XML input (or other input types) displayed by a presentation engine. FIG. 2 sets forth such a presentation engine 20, along with scenes 22 and an indication of the ability to playback 24 an animation.

The presentation engine 20 (also called the "Qwiki presentation engine" in FIG. 2) includes pre-fabricated scenes 22 that animate, for example, the following:

Standard strings of text
Bulleted lists of text
Images & Video
Dates
Quality ratings ("5 stars")
Addresses & Maps
Line graphs
Pie charts
Timelines
Ranges
Internet URLs
Yes/no Data Points Each scene 22 can consist of one of the data types mentioned above. Optionally, new scenes 22 can be created that contain multiple data types—using XML markup (as shown in the example of FIG. 2), a developer defines a new type of scene on the fly. For example, the type of scene can be a map being displayed alongside text or a star rating describing a local business.

In one embodiment, each animation can be composed of successions of screens composed of a maximum of 14 scenes, with each scene running 2-3 seconds and including transitions lasting 1-2 seconds. The number of scenes and time for each scene can vary widely within the scope of the invention.

1. The Master Data Type

As set forth above for one embodiment, the look and feel of each presentation is defined by an XML document (or other type of document) that governs playback of the presentation. In one exemplary embodiment, the first step in creating an XML document that defines a presentation involves assigning values to seven main options for presentation playback:

Descriptive Name
Music mp3 URL
Narration Text OR Narration mp3 URL
Background Image
Size
Included Scenes and order of play
Start Mode (Play or Browse)

In addition, in this embodiment, there are several XML components generic to any presentation that coordinate on-screen action. In addition, other types of components can be used. Examples include:

Display Time sets the amount of time the scene is visible (this can be auto-calculated by the presentation engine, but can also be available as a customized option for users)

Movement sets the on-screen XY location of the scene in relation to the player. If set to "fullscreen", the scene will occupy the full real estate of the player for the amount of time it is displayed.

Transition parameters govern the manner in which each scene transitions into another, by selecting from a library of pre-created transitions addressed by human readable names.

onClick specifies a URL to open in a new window upon a mouse click.

The included scenes and order of play can be defined within the same file (such as an XML file) that lists the main options for playback via a set of programmatic instructions specific to each scene type. Many types of scene structures can be used within the scope of the invention, including the following scene structures:

1. TEXT

XML Data type name: "Text"
Default Components:
　Display Time
　Movement
　　Initial_State (XY coordinates)
　　Final_State (XY Coordinates)
　onClick
　Transition
Scene Specific Components:
　Background Color
　Text Title
　Text Body
　Font Color
　Font Size 2. BULLETED LISTS OF TEXT
   XML Data type name: "List"
   Default Components:
      Display Time
      Movement
         Initial_State (XY coordinates)
         Final_State (XY Coordinates)
      onClick
      Transition
   Scene Specific Components:
      Background Color
      List Title
      Per list item:
         List item text
      Font Color
      Font Size
3. IMAGES
   XML Data type name: "Image"
   Default Components:
      Display Time
      Movement
         Initial_State (XY coordinates)
         Final_State (XY Coordinates)
      onClick
      Transition
   Scene Specific Components:
      Image URL
      KenBurns
         StartXY1
         StartXY2
         EndXY1
         EndXY2
      Caption
4. MEDIA
   XML Data type name: "Media"
   Default Components:
      Display Time
      Movement
         Initial_State (XY coordinates)
         Final_State (XY Coordinates)
      onClick
      Transition
   Scene Specific Components:
      Media URL
5. DATE
   XML Data type name: "Date"
   Default Components:
      Display Time
      Movement
         Initial_State (XY coordinates)
         Final_State (XY Coordinates)
      onClick
      Transition
   Scene Specific Components:
      Background Color
      Date
      Text Title
      Text Body
      Font Color
      Font Size
      Effect
6. RATING
   XML Data type name: "Rating"
   Default Components:
      Display Time
      Movement
         Initial_State (XY coordinates)
         Final_State (XY Coordinates)
      onClick
      Transition
   Scene Specific Components:
      Text Title
      Rating Value
      Rating Range Start
      Rating Range End
      Empty Rating Image URL
      Half Rating Image URL
      Full Rating Image URL
      Font Color
      Font Size
7. ADDRESSES & MAPS
   XML Data type name: "Map"
   Default Components:
      Display Time
      Movement
         Initial_State (XY coordinates)
         Final_State (XY Coordinates)
      onClick
      Transition
   Scene Specific Components:
      Title
      Lat
      Long
8. LINE GRAPHS
   XML Data type name: "Line_Graph"
   Default Components:
      Display Time
      Movement
         Initial_State (XY coordinates)
         Final_State (XY Coordinates)
      onClick
      Transition
   Scene Specific Components:
      Title
      X-Axis Label
      Y-Axis Label
      Title Color
      Graph Color
      Background Color
      Text Size
      Per data point:
         X value
         Y value
         Label
9. PIE CHARTS
   XML Data type name: "Pie_Chart"
   Default Components:
      Display Time
      Movement
         Initial_State (XY coordinates)
         Final_State (XY Coordinates)
      onClick
      Transition Scene Specific Components:
  Background Color
  Title
  Font Color
  Font Size
  Per slice:
    Label
    Percentage
    Text Color
    Slice Color
    Text Size 10. TIMELINES
  XML Data type name: "Timeline"
  Default Components:
    Display Time
    Movement
      Initial_State (XY coordinates)
      Final_State (XY Coordinates)
    onClick
    Transition
  Scene Specific Components:
    Background Color
    Title
    Text Color
    Text Size
    Line Color
    Per Event:
      Title
      Date
      Description
      Image URL 11. RANGE
  XML Data type name: "Range"
  Default Components:
    Display Time
    Movement
      Initial_State (XY coordinates)
      Final_State (XY Coordinates)
    onClick
    Transition
      Scene Specific Components:
    Background Color
    Text Title
    Font Color
    Font Size
    Range Start
    Range End 12. INTERNET URL
  XML Data type name: "Webpage"
  Default Components:
    Display Time
    Movement
      Initial_State (XY coordinates)
      Final_State (XY Coordinates)
    onClick
    Transition
  Scene Specific Components:
    Background Color
    Text Title
    Text Body
    Font Color
    Font Size
    URL
    Thumbnail URL 13. YES/NO DATA POINT
  XML Data type name: "Data_point"
  Default Components:
    Display Time
    Movement
      Initial_State (XY coordinates)
      Final_State (XY Coordinates)
    onClick
    Transition
  Scene Specific Components:
    Background Color
    Label
    Value (Yes/No/Neutral)
    Font Color
    Font Size Together, the master settings, as well as labels and settings for each scene, combine into a single file (such as an XML file) that is interpreted by the presentation engine at run-time and generates an animation displayed to the user.

2. Defining Custom Scenes

In one embodiment, using a scripting language (such as, but not limited to, XML scripting language), new scenes can be defined that incorporate different, pre-existing data types (i.e., the previously-mentioned map example combining a text scene and a map scene into a single, new type of scene for business addresses).

Figure 3:
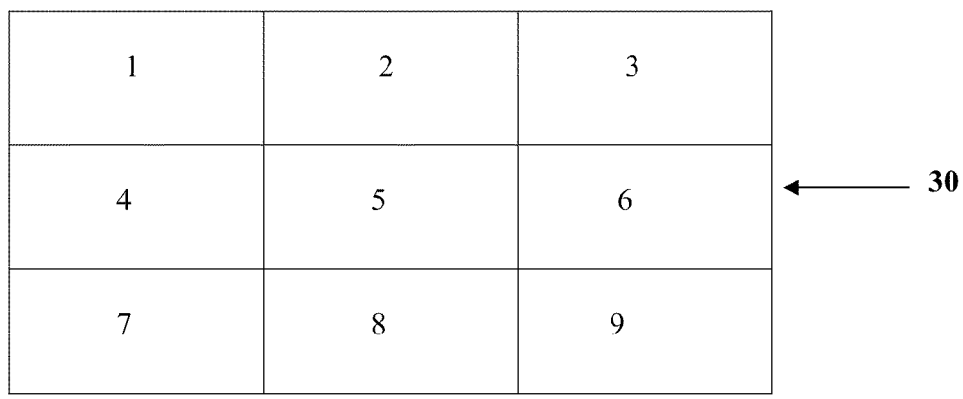
FIG. 3 is one embodiment showing the assembly of scenes into a presentation.

According to one embodiment, any of the thirteen component pre-fabricated scenes set forth above, or new custom scenes defined by developers, are positioned within a single, new scene by specifying their location within the displayed animation based on coordinates of a 3×3 XY grid 30 (see FIG. 3). These scene configurations are stored for reuse and made addressable by assigning them a human-readable name.

3. Animation & Playback

One aspect that can lead to successful user adoption of presentations set forth herein will be the manner in which the information contained within the templates is linked and presented as a cohesive movie or video clip.

Figure 4:
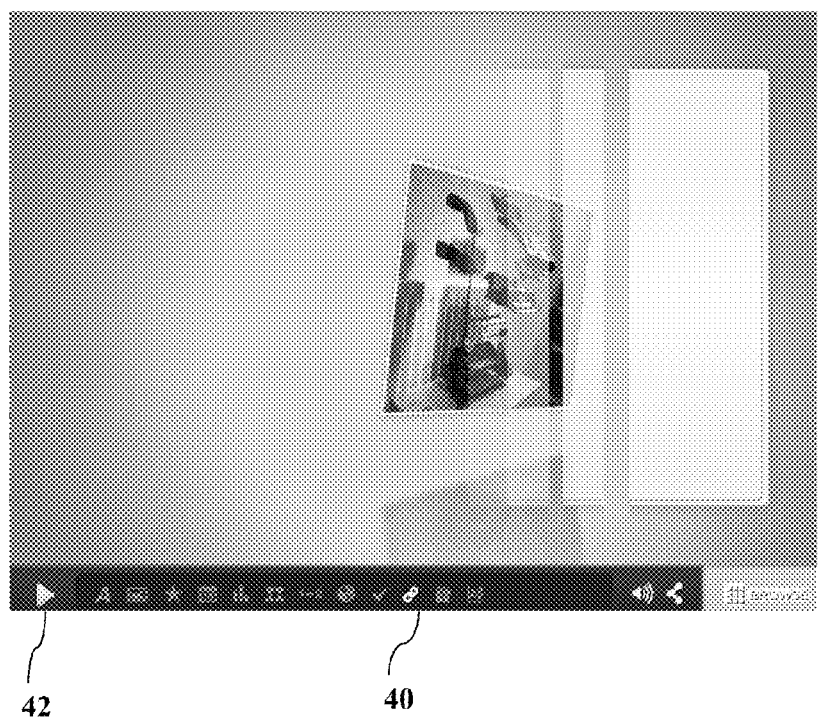
FIG. 4 is a screen shot of a playback screen according to an embodiment of the invention.

In one embodiment, to begin, upon loading, the presentation engine plays the animation from start to finish by reading from an XML that defines playback, in the manner depicted in FIG. 4. Note the "Chapter Menu" 40 on the bottom of the player—using this menu, users can preview and advance to any scene contained within a presentation.

FIG. 4 is a screen-capture of the transition between two scenes, one containing an image, and the other containing text.

Figure 5:
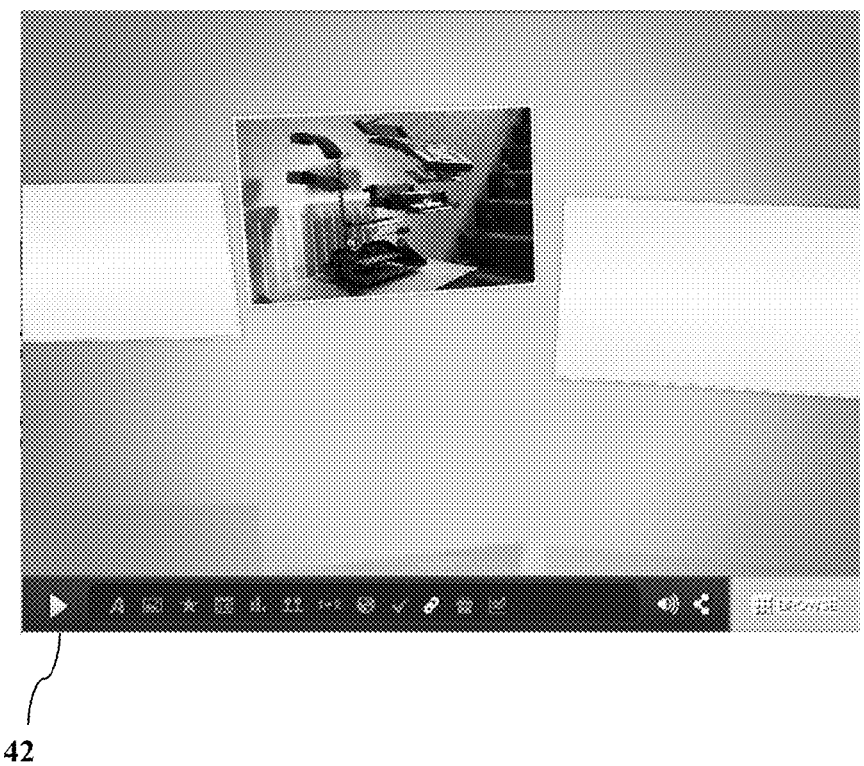
FIG. 5 is a second screen shot of a playback screen according to another embodiment of the invention.

At any point, users can also interrupt the playback to browse the floating templates and manually expand/collapse them by clicking the browse button (or anywhere on the video), then resume playback via the play button 42 on the control bar. See, for example, FIG. 5.

Different types of scenes also can have interactive triggers that will pause playback—for example, users can click a "Read More" button on a text scene, at which point playback will pause and users will be able to scroll to read additional text beyond what has been displayed on-screen in any given text template.

C. Searching

The search methodology of some embodiments of the invention is based on a series of techniques for normalizing structured data found on web pages or within strings of text via a set of rules governing the assignment of multimedia properties to the terms and phrases, based upon a semantic understanding of the same.

Upon input of a keyword or set of keywords into the search engine, information matches can be evaluated by searching a series of data sources with publicly addressable API's selected by human editors, public data, vendor private data, and data refined by the system of the invention. Typically, each source represents a specific vertical of information (i.e., Wikipedia for general knowledge or Yelp & Citysearch for restaurants).

Figure 6:
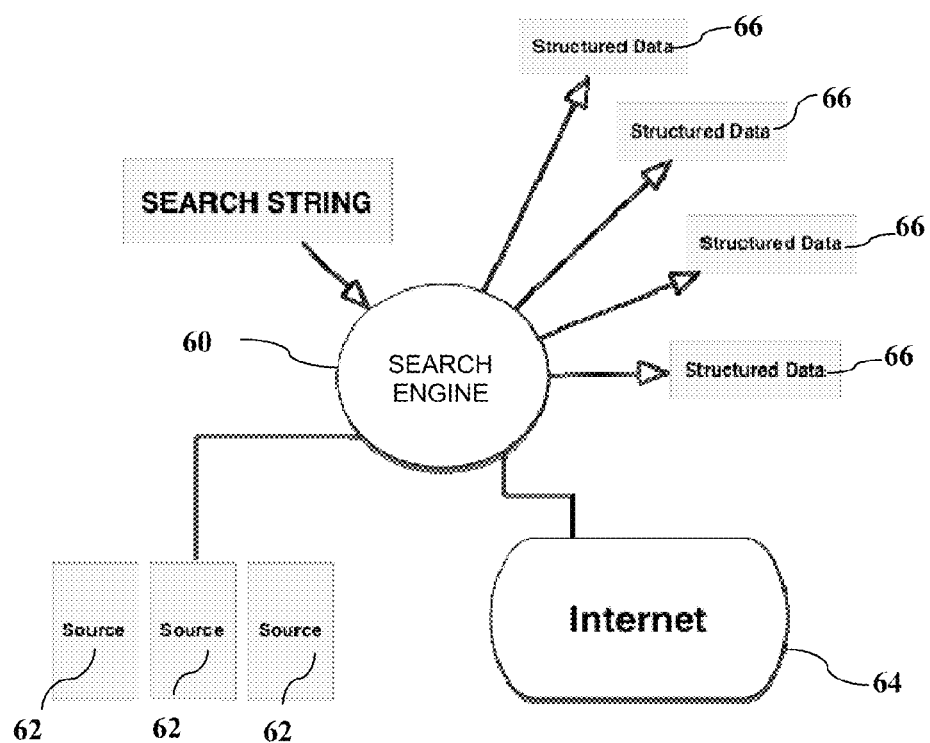
FIG. 6 is a block diagram of one embodiment of a search engine according to the invention.

If no exact matches are found within the pre-selected data sources, the search engine can search the web or other databases at large, retrieving structured sets of data corresponding to the thirteen default scene types set forth above (Images, Timelines, Dates, Ratings, etc.) from web pages or databases identified as a match for the keywords input. FIG. 6 depicts such a search with structured data 66 being retrieved from data sources 62. In FIG. 6, wherever the search engine 60 finds a match, a link to the original data source 62 is included when the information is presented to the user. In this example, the information is presented via the Internet 64. For exemplary purposes, FIG. 6 shows three data sources 62 and four sets of structured data 66.

In some embodiments, the search engine extracts and stores any data it recognizes to a temporary data warehouse, enabling the next step of animating coherent search results: normalization.

1. Multimedia Normalization Via Structured Data Analysis

Via careful analysis of each piece of data extracted from structured data sources or free-form web pages, the presentation engine generates a short 1-3 second animation presenting the key pieces of information contained within the data, complemented by a set of internal processes to augment the data in whatever method necessary. The animation length can vary within the scope of the invention, including being less than 1 second or more than 3 seconds in length, for example.

Figure 7:
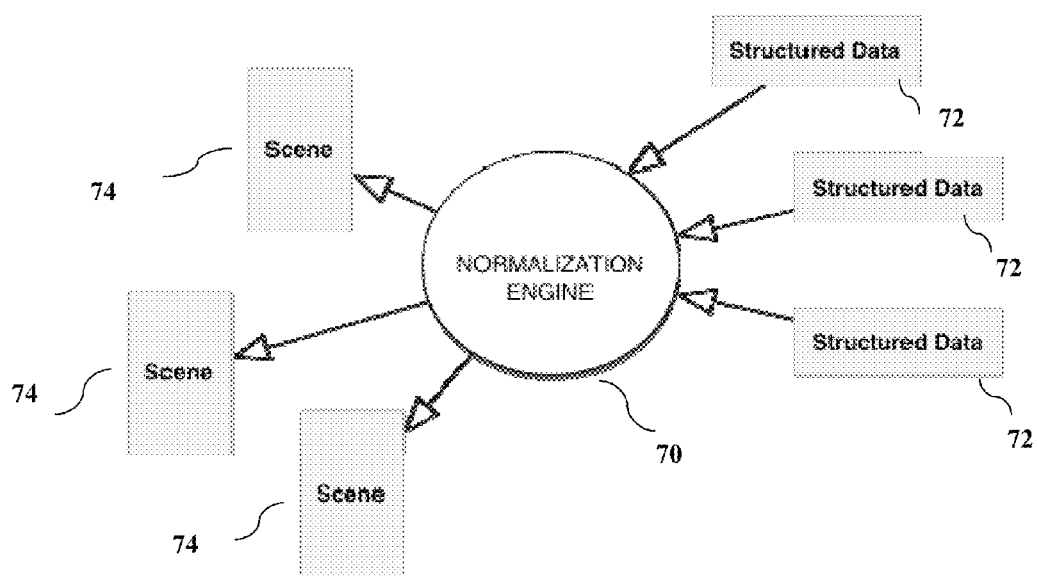
FIG. 7 is a block diagram of one embodiment of a normalization engine.

FIG. 7 depicts a normalization engine 70 performing this normalization process. This process of analyzing each piece of data, identifying its component parts, recognizing the nature of each part, and assigning an animated value or identity to each part, is known as "normalization." In FIG. 7, the normalization engine 70 receives structured data 72 (in this example, three sets of structured data 72), analyzes this data to identify its component parts and assign values to it, and outputs the normalized data to scenes 74 (here, three scenes 74 are depicted).

For example, a piece of structured data from a Citysearch web page identifying a quality rating on a local business can appear as follows (extracted from the Citysearch.com web site):

```
<span class="big_stars rating"><img
src="http://images.citysearch.net/assets/guide/images/
star_rating_sprites.gif"
class="average stars_9" alt="4.5 Star Rating:
Recommended" title="4.5 Star Rating:
Recommended"/></span><span class="reviewCount">
```

This string can be analyzed to extract its component parts—in this case, the range of the quality rating and this particular business' value on this scale—and rewritten in an XML markup (or other language) to prepare the data governing playback of the animation. The following shows one exemplary structure governing playback of the animation:

```
<rating animation_id="1">
    <label font_color="FF6600" font_size="14">4.5 Star Rating:
Recommended</label>
    <range>5</range>
```

```
    <value>4.5</value>
    <default_rating>http://images.citysearch.net/assets/guide/images/
star_rating_sprites.gif</default_rating>
    <full_rating></full_rating>
    <half_rating></half_rating>
    <empty_rating></empty_rating>
</rating>
```

This normalization process can occur for every piece of data recognized as a match for the given keyword.

After translating the data into XML (or a different language), the presentation engine generates and stores each recognized piece of data within a temporary data warehouse, for later prioritization and potential presentation by the engine.

2. Multimedia Normalization Via Free-Form Strings

In addition to the dynamic creation of multimedia XML-defined "scenes" in response to a search query, the presentation engine is able to generate multimedia for any set of strings submitted by users or publishers. Through this process, the presentation engine can generate a compelling animation describing individual topics, daily activities, or for any other purpose suited to the description in a few lines of text to a paragraph of text (such as, for example, 100-300 characters of text).

In this case, the presentation engine can apply the same normalization schema within a block of text as to structured data sources, analyzing and extracting recognized data types from the string upon submission to the engine.

For example, the following text contains four data types recognized by the presentation engine:

"10/9/07: Ate at Landmarc Restaurant in New York City. ***. The burger was a little overcooked."

10/9/07 is recognized and stored as a Qwiki date type

Landmarc Restaurant in New York City is recognized and stored as a mapped location

*** is recognized and stored as a star quality rating.

Each sentence of text is recognized and stored as text to be animated

Any images/media uploaded or appended are recognized as such.

The string therefore generates the following XML, as an example:

```
<template type="0" duration="2" transition_initial_id="1"
transition_final_id="1" click_url="">
    <date animation_id="1">
        <title font_color="FF6600" font_size="14"></title>
        <value>2007-09-10</value>
        <era>AD</era>
        <description font_color="0085B8" font_size="12"></description>
        <image />
    </date>
    <map animation_id="1" width="300" height="300">
        <lat>40.714269</lat>
        <long>-74.005973</long>
        <title font_color="FF6600" font_size="14"></title>
        <address font_color="0085B8" font_size="12">New
York City</address>
    </map>
    <rating animation_id="1">
        <label font_color="FF6600" font_size="14">4.5 Star Rating:
Recommended</label>
        <range>5</range>
        <value>4.5</value>
<default_rating>http://images.citysearch.net/assets/guide/images/
star_rating_sprites.gif</default_rating>
        <full_rating></full_rating>
```

```
    <half_rating></half_rating>
    <empty_rating></empty_rating>
  </rating>
  <text animation_id="1" background_color="000000" pos1_x="200"
pos1_y="10">
    <title font_color="FF6600" font_size="14">Landmarc</title>
    <body font_color="0085B8" font_size="12">Ate at
Landmarc Restaurant in New York City. The burger was a
little overcooked.</body>
  </text>
</template>
```

In an identical process to assembling search results, after translating the data into XML, the presentation engine can generate and store each recognized piece of data within a temporary data warehouse, for later prioritization and potential presentation by the engine.

3. Narrative Extraction

A core piece of the multimedia experience involving a string of descriptive text or search results involves a narrator describing on-screen action. The presentation engine integrates text-to-speech software (which can, for example, be third-party software) coordinated with the contents of the generated animation to present a cohesive narration complementing the information presented within the player.

Figure 8:
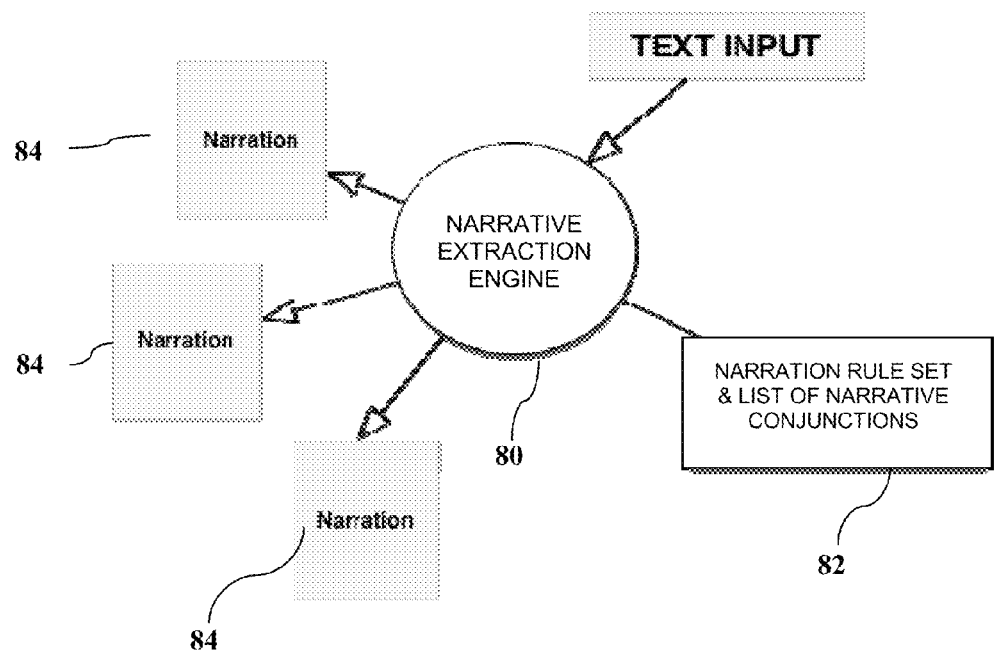
FIG. 8 is a block diagram of an extraction engine according to one embodiment of the invention.

In order to provide accurate narration, in one embodiment, a narrative paragraph that matches the data presented within the visuals needs to be identified from source data, whether this data is a pre-selected source or the web at large. FIG. 8 sets forth one embodiment of a narrative extraction engine 80. In this embodiment, the narrative extraction engine 80 applies a set of narration rules 82, which can include narrative conjunctions, to identify text that can complement on-screen media as a narration 84.

As an example, this narration process can include the identification of a narrative conjunctor—"is a", "was a", "has been" etc., or identification of sources containing narrative signifying words in their titles and/or META tags such as "bio" or "profile", to extract and properly identify any text that can complement on-screen media as narration. An example of the narrative conjunction identification process, which is exemplary only, is demonstrated in the below text describing an executive from a television studio found via a web search for "Barry Meyer":

http://www.timewarner.com/corp/management/execu-
    tives_by_business/warner_bros/bio/meyer_barry.html
  Title: "Time Warner—Barry M Meyer"
  Meta description: "Bio of Barry M. Meyer . . ."
  Narration Excerpted:
  Barry M. Meyer, one of the most respected executives in
    the entertainment industry, became Chairman & Chief
    Executive Officer of Warner Bros. on Oct. 4, 1999 after
    having served as the Studio's Executive Vice President
    & Chief Operating Officer since April 1994 . . . .

If multiple narrations are identified, the presentation engine performs string analysis to determine the narrative text that contains the most similar number terms of all the matches, ultimately selecting the most comprehensive narrative available.

D. Music Selection

In some embodiments, the primary method of selecting the music to accompany an animation can occur by analyzing the narrative description that has been selected to accompany the presentation and searching for one of 3,000 keywords (mapped to 1,000,000+ synonyms) representing the many thousands of tracks that may be licensed from commercial music providers for inclusion in animations.

Each track ingested into the audio engine can include a category and time period that describes its pacing, tempo, and audio "character". These tags can be recorded by human editors who manually evaluate each piece of music.

Figure 9:
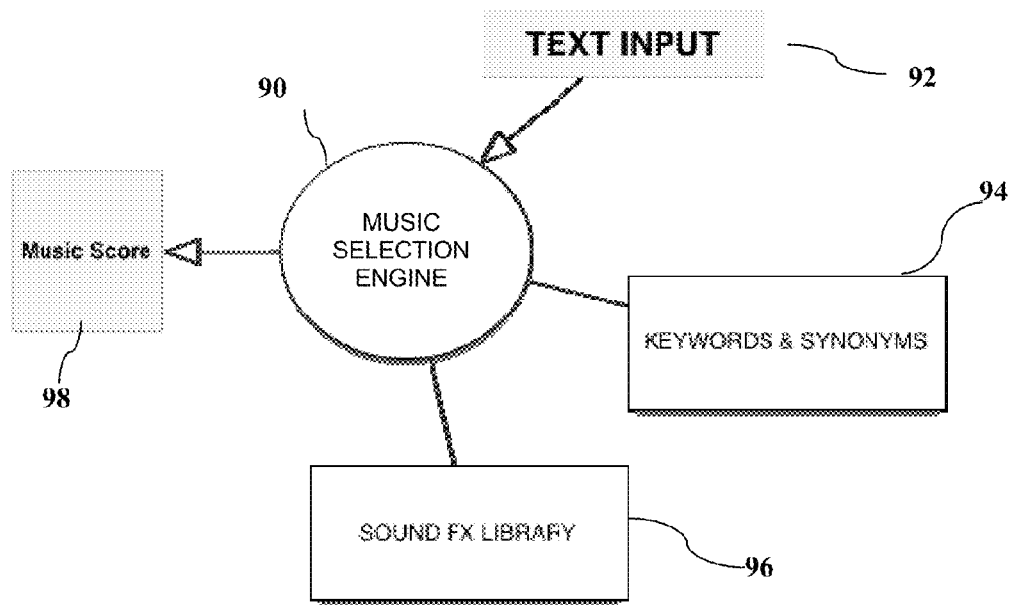
FIG. 9 is a block diagram of a selection engine according to one embodiment of the invention.

In some embodiments, sound effects are also prepared and dynamically presented to coincide with the type and amount of on-screen data (i.e., a text scene with a high number of characters visible will generate a longer "typing" sound effect than one with a fewer number of characters). FIG. 9 depicts one embodiment of a music selection engine 90. In this embodiment, the music selection engine 90 receives a text input 92, uses keywords and synonyms 94 to search through the text input 92 for matches, and then uses a sound library 96 to find matching music or sound for the scene. A music score 98 can result from this process using the music selection engine 90.

1. Animation Assembly & Prioritization

After all the scenes have been generated via analysis of text or search sources, the presentation engine can evaluate and assign a quality rating to each data type based upon the information contained within, and information concerning where the data was sourced from.

The data types can then be assembled into an animation in order of their quality rating, per the following rules, which can be used in one embodiment of the invention:
  Each data type has a default score:
    Images & Video: 12
    Addresses & Maps: 11
    Bulleted lists of text: 6, +1 for each bullet
    Dates: 9
    Timelines: 8
    Quality ratings ("5 stars"): 7
    Line graphs: 6
    Pie charts: 5
    Range: 4
    Yes/no Data Point: 2
    Internet URL: 3
    Standard strings of text: 1
  The default scores are modified per the following rules and
    additional rules developed based upon human input and
    machine learning techniques:
    Data types with manual input are assigned +1 points for
      each manual edit committed
    Images sourced from thumbnails within web pages
      receive +1 points
    Images within captions receive +1 points
    Text based on capitalized multi-word phrases linked
      within source data accompanied by an image receive
      +2 points
    Text based on terms linked within source data receive +1
      points
    Text based on un-capitalized linked terms receives −1
      points
  In some embodiments, once the data types are assembled in descending order according to their score, the following rules (and additional rules developed upon human input and machine learning techniques) can be used to prioritize the maximum 14 scenes to include:
    There must be a 1:1 ratio of image or media types to non
      image or media types
    An image must always start the animation
    If possible, scenes of the same data type can never play
      back-to-back
    Text scenes that repeat more than 80% of narration are
      discarded All scenes receive a calculated amount of on-screen time depending on the length of their contents, established via character counts or size of images, with 1 second per 100 characters or 100 pixels.

Figure 10:
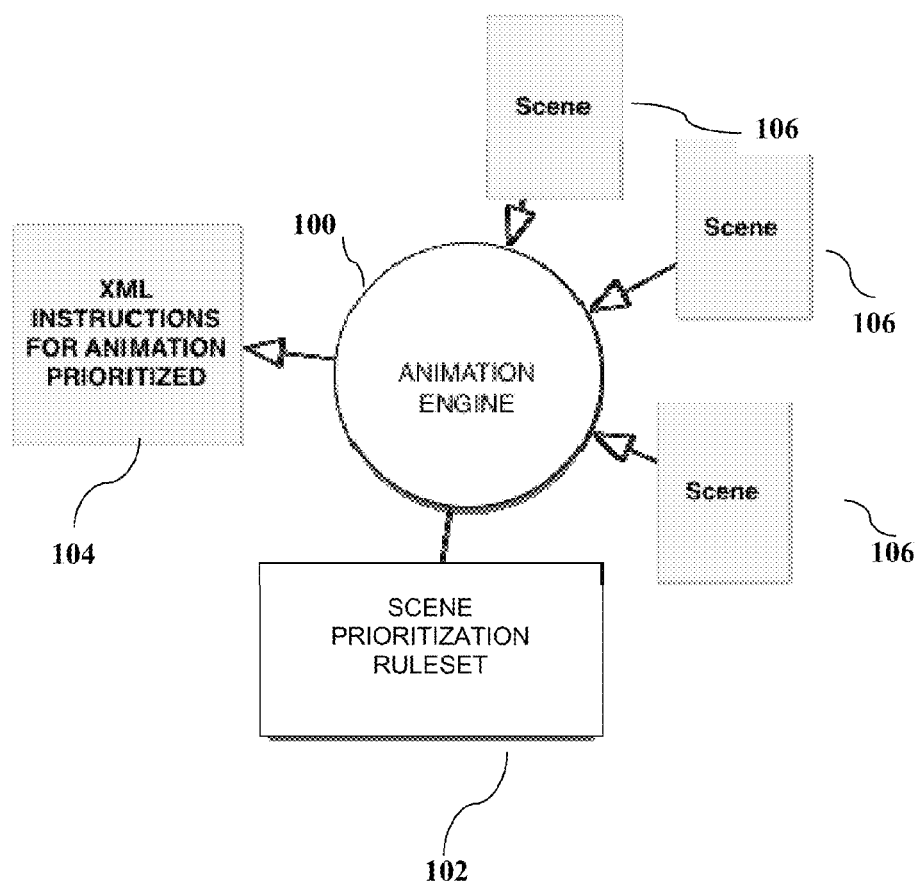
FIG. 10 is a block diagram of an animation engine according to one embodiment of the invention.

The application of these rules allows the presentation engine to generate an XML file closely corresponding to the input, which is then interpreted by the presentation engine and displayed to the user in the manner consistent with the animation practices described in the first section of this application. FIG. 10 sets forth one embodiment of an animation engine 100 combined with a scene prioritization rulesets 102 and XML instructions for animation prioritization 104. The animation engine 100 and ruleset 102 can organize the scenes 106 for animation prioritization 104.

The methodology set forth above is one way of determining what information to include, but other methods can also be used within the scope of the invention.

As set forth herein, the presentation engine accepts input consisting of passages of text or any alphanumeric string (or set of strings) or queries selected from pull-down menus or selected text on screen. In response, it assembles short (1 minute or less) animated presentations defining (or corresponding to) the semantic meaning of the input. Each animation includes a dynamically rendered set of multimedia "scenes" created on the fly. Other embodiments are also within the scope of the invention.

The components set forth above can be combined to form one system according to an embodiment of the invention. In this embodiment, for instance, the system can include a query interface to accept at least one input keyword relating to a subject for the animation, a database having a set of at least two templates, a searching engine to retrieve data from a plurality of websites, a runtime engine to determine which data to assemble into the set of templates, and an animation engine to present the animation for playback to the user. The runtime engine can include, for example, the normalization engine, extraction engine, and selection engine set forth above. In addition, the presentation engine according to one embodiment of the invention can include each of the query interface, the database, the normalization engine, extraction engine, selection engine, and the animation engine. The searching engine can dynamically retrieve data from a plurality of data sources.

While the invention has been described with reference to the exemplary embodiments set forth above, those skilled in the art will be able to make various modifications to the described embodiments of the invention without departing from the spirit and scope of the invention. Accordingly, the exemplary description above is not meant to limit the scope of the invention, and only the claims are meant to do so.

What is claimed is:

1. A method comprising:
accepting, by a processor, at least one input keyword relating to a subject for an animation;
accessing, by the processor, a set of at least two templates, wherein each template generates a different type of output, each template represents a pre-fabricated type of scene, and each template includes components for display time, screen location, and animation parameters;
retrieving, by the processor, data from a plurality of data sources using an electronic search based on the at least one input keyword and the templates, the plurality of data sources comprising an Internet search and retrieval of data from web pages;
determining, by the processor, which retrieved data to assemble into the set of templates;
coordinating, by the processor, assembly of data-populated templates by translating, by the processor, the retrieved data and the at least one input keyword into markup computer language code stored into a memory;
prioritizing, by the processor, the data-populated templates stored in the memory for playback such that the animation is based on a predefined ratio of one media type of scene to another, different media type of scene; and
generating, by the processor, the animation by using at least the data-populated templates, the markup computer language code, and the prioritization for playback by a user.

2. The method of claim 1, further comprising prioritizing the templates for playback based on the type of scene.

3. The method of claim 1, wherein the scenes include text, images, and media.

4. The method of claim 1, wherein the animation includes instructions that define playback of the animation.

5. The method of claim 1, wherein the act of determining includes analyzing data and assigning values to the data for potential inclusion in the templates for the animation.

6. The method of claim 1, further including identifying narrative text to complement the animation during playback.

7. The method of claim 1, further including determining matching music or sound for the animation based on the at least one keyword.

8. The method of claim 1, wherein the act of retrieving data includes dynamically retrieving data from a plurality of data sources.

9. A system comprising:
a query interface for presentation to a user, the query interface being used to accept at least one input keyword relating to a subject for an animation;
a database having a set of at least two templates, wherein each template generates a different type of output, each template represents a pre-fabricated type of scene, and each template includes components for display time, screen location, and animation parameters;
a searching engine executed by a processor to retrieve data from a plurality of data sources using an electronic search based on the at least one input keyword and the templates, the plurality of data sources comprising an Internet search and retrieval of data from web pages;
determining logic executed by the processor to determine which retrieved data to assemble into the set of templates;
a runtime engine executed by the processor to coordinate assembly of data-populated templates by translating the retrieved data and the at least one input keyword into markup computer language code stored into a memory;
prioritizing logic executed by the processor to prioritize the data-populated templates stored in the memory for playback such that the animation is based on a predefined ratio of one media type of scene to another, different media type of scene; and
an animation engine executed by the processor to generate the animation by using at least the data-populated templates, the markup computer language code, and the prioritization for playback to the user.

10. The system of claim 9, wherein the runtime engine includes a normalization engine to analyze data and assign values to the data for potential inclusion in the templates for the animation.

11. The system of claim 10, wherein the runtime engine includes an extraction engine to identify narrative text to complement the animation during playback.

12. The system of claim 11, wherein the runtime engine includes a selection engine for determining matching music or sound for the animation based on the at least one keyword.

13. The system of claim 9, wherein the animation engine prioritizes the templates for playback based on the type of scene.

14. The system of claim 9, wherein the animation engine further prioritizes the templates for playback based on a ratio of one type of scene to another type of scene.

15. A non-transitory computer readable storage medium storing computer program instructions capable of being executed by a computer processor on a computing device, the computer program instructions defining the steps of:

accepting, by the computer processor, at least one input keyword relating to a subject for the animation;

accessing, by the computer processor, a set of at least two templates, wherein each template generates a different type of output, each template represents a pre-fabricated type of scene, and each template includes components for display time, screen location, and animation parameters;

retrieving, by the computer processor, data from a plurality of data sources using an electronic search based on the at least one input keyword and the templates, the plurality of data sources comprising an Internet search and retrieval of data from web pages;

determining, by the computer processor, which retrieved data to assemble into the set of templates;

coordinating, by the computer processor, assembly of data-populated templates by translating, by the computer processor, the retrieved data and the at least one input keyword into markup computer language code stored into a memory;

prioritizing, by the computer processor, the data-populated templates stored in the memory for playback such that the animation is based on a predefined ratio of one media type of scene to another, different media type of scene; and generating, by the computer processor, the animation by using at least the data-populated templates, the markup computer language code, and the prioritization for playback by a user.

\* \* \* \* \*